(12) United States Patent
Dauth et al.

(10) Patent No.: US 6,177,511 B1
(45) Date of Patent: Jan. 23, 2001

(54) AMINO SILICONE OIL EMULSIONS CROSSLINKED BY REACTIONS SIMILAR TO A MICHAEL ADDITION

(75) Inventors: Jochen Dauth; Bernward Deubzer, both of Burghausen; Robert Schröck, Altötting; Petra Gratzl, Tüssling, all of (DE)

(73) Assignee: Wacker-Chemie GmbH, Munich (DE)

( * ) Notice: Under 35 U.S.C. 154(b), the term of this patent shall be extended for 0 days.

(21) Appl. No.: 09/236,809

(22) Filed: Jan. 25, 1999

(30) Foreign Application Priority Data

Jan. 29, 1998 (DE) ................................. 198 03 468

(51) Int. Cl.[7] .......................... C08G 77/20; C08G 77/26
(52) U.S. Cl. .................... 524/838; 524/801; 524/157; 524/158; 524/161; 528/38; 528/32; 528/26
(58) Field of Search ................................ 528/38, 32, 26; 524/801, 838, 157, 158, 161

(56) References Cited

U.S. PATENT DOCUMENTS

| 4,661,551 | 4/1987 | Mayer et al. . |
| 4,698,406 | 10/1987 | Lo et al. . |
| 6,011,114 | * 1/2000 | Liles et al. ........................... 524/837 |

FOREIGN PATENT DOCUMENTS

| 0 475 363 | 3/1992 | (EP) . |
| 0 267 003 | 7/1992 | (EP) . |
| 0 228 575 | 2/1993 | (EP) . |
| 0 739 928 | 10/1996 | (EP) . |
| 0 739 929 | 10/1996 | (EP) . |
| 0 739 947 | 10/1996 | (EP) . |
| 0 780 422 A2 | 6/1997 | (EP) . |
| 0 844 268 | 5/1998 | (EP) . |

OTHER PUBLICATIONS

W. Noll, "Chemistry and Technology of Silicones", Academic Press Inc., 1968, pp. 208–209.

* cited by examiner

Primary Examiner—Robert Dawson
Assistant Examiner—Kuo-Liang Peng
(74) Attorney, Agent, or Firm—Brooks & Kushman P.C.

(57) ABSTRACT

Novel organopolysiloxane compositions comprising
- (A) organopolysiloxanes which contain at least one SiC-bonded organic radical containing basic nitrogen, where the basic nitrogen is optionally present in part as a salt of a water-soluble organic acid, water-soluble inorganic acid, or water-insoluble organic acid,
- (B) anionic, cationic, nonionic or amphoteric surfactants, which are in soluble or soluble in (A)
- (C) substituted or unsubstituted diacrylates and/or oligoacrylates, and optionally,
- (C') substituted or unsubstituted acrylates, and
- (D) water are described.

19 Claims, No Drawings

AMINO SILICONE OIL EMULSIONS CROSSLINKED BY REACTIONS SIMILAR TO A MICHAEL ADDITION

TECHNICAL FIELD

The present invention relates to emulsions and microemulsions of amino-functional organosiloxanes and di- and/or oligo(meth)acrylates, and their Michael addition products.

BACKGROUND ART

Numerous silicone oil (micro)emulsions containing amino groups bound via Si-C bonds are known from the literature. Crosslinked silicone structures in emulsion are usually prepared by introduction of T or Q moieties (trifunctional or tetrafunctional siloxane units).

The polymerization of cyclopolyorganosiloxanes in emulsion to form polydiorganosiloxane microemulsions is described in EP-B 228 575 (Dow Corning Corporation; published on Feb. 3, 1993). Functional groups can be incorporated by means of appropriate alkoxysilanes, with branching established via T silanes (trifunctional silanes).

Silicone latices are disclosed in EP-A 739 928 (Dow Corning Corporation; published on Oct. 30, 1996). Crosslinking in emulsion occurs by means of a condensation reaction, addition reaction, or free-radical polymerization reaction. Addition reactions occur, for example, by addition of Si-bonded hydrogen onto Si-bonded vinyl groups.

Self-crosslinking silicone emulsions are known from EP-A 739 947 (Dow Corning Corporation; published on Oct. 30, 1996). Crosslinking occurs via acetoxy, aminoxy, acetamido, carboxyl, cycloalkyl, or oxime groups.

EP-A 739 929 (Dow Corning Corporation; published on Oct. 30, 1996) describes silicone latices having good thermal stability. The properties are achieved by means of specific emulsifiers.

Room temperature crosslinkable silicone elastomers are disclosed in U.S. Pat. No. 4,698,406 (Dow Corning Corporation; issued on Oct. 6, 1987). The silicone elastomers are prepared by reaction of amino silicones with silicone acrylates which is similar to a Michael addition.

A process for preparing silicone microcapsules by means of a reaction of silicones containing acryl and amino groups which is similar to a Michael addition is described in EP-B 267 003 (Dow Corning Corporation; published on Jul. 29, 1992).

A reaction of amino-functional polyorganosiloxanes with monoacrylated polyoxyalkylenes which is similar to a Michael addition is disclosed in EP-A 475 363 (Dow Corning Toray Silicone, published on Mar. 18, 1992). When used as textile finishing materials, the polyorganosiloxanes are notable for a low degree of yellowing and a good feel. The preparation is carried out in solution and does not allow a reaction with diacrylates, which would inevitably lead to gelling.

DISCLOSURE OF INVENTION

It is an object of the invention to provide organopolysiloxane compositions which are obtained from aminofunctional organopolysiloxanes. A further object is to provide organopolysiloxane emulsions which are obtained by crosslinking aminosilicone oil emulsions or aminosilicone oil microemulsions and, if desired, additionally functionalizing the dispersed phase without the emulsion breaking.

DESCRIPTION OF THE PREFERRED EMBODIMENTS

The invention provides organopolysiloxane compositions comprising
(A) organopolysiloxanes which contain at least one SiC-bonded organic radical containing basic nitrogen, where the basic nitrogen can be present partially as a salt of a water-soluble organic or inorganic acid or water-insoluble organic acid,
(B) anionic, cationic, nonionic or amphoteric surfactants which are insoluble or soluble in (A),
(C) substituted or unsubstituted diacrylates and/or oligoacrylates, if desired (C') substituted or unsubstituted acrylates and
(D) water.

The invention also provides organopolysiloxane compositions which can be prepared by reacting emulsions comprising
(A) organopolysiloxanes which contain at least one SiC-bonded organic radical containing basic nitrogen, where the basic nitrogen can be present partially as a salt of a water-soluble organic or inorganic acid or water-insoluble organic acid,
(B) anionic, cationic, nonionic or amphoteric surfactants which are insoluble or soluble in (A) and
(D) water with
(C) substituted or unsubstituted diacrylates and/or oligoacrylates and, if desired (C') substituted or unsubstituted acrylates in a reaction similar to a Michael addition.

The invention further provides a process for preparing organopolysiloxane compositions which comprises reacting emulsions comprising
(A) organopolysiloxanes which contain at least one SiC-bonded organic radical containing basic nitrogen, where the basic nitrogen can be present partially as a salt of a water-soluble organic or inorganic acid or water-insoluble organic acid,
(B) anionic, cationic, nonionic or amphoteric surfactants which are insoluble or soluble in (A) and
(D) water with
(C) substituted or unsubstituted diacrylates and/or oligoacrylates and, if desired (C') substituted or unsubstituted acrylates in a reaction similar to a Michael addition.

The organopolysiloxanes which contain at least one SiC-bonded organic radical containing basic nitrogen preferably comprise units of the formula

$$R_a Y_b Si(OR^1)_c O_{\frac{4-(a+b+c)}{2}}, \qquad (I)$$

where
R can be identical or different and are each a hydrogen atom or a monovalent organic radical containing no basic nitrogen,
$R^1$ can be identical or different and are each a hydrogen atom, an alkyl radical or an alkoxyalkyl radical,
Y can be identical or different and are each a monovalent, SiC-bonded radical containing basic nitrogen,
a is 0, 1, 2 or 3
b is 0, 1 or 2 and
c is 0, 2 or 3, with the proviso that the sum of a, b and c in the units of the formula (I) is less than or equal to 3 and at least one radical Y is present per molecule.

The radicals R are preferably monovalent hydrocarbon radicals having from 1 to 18 carbon atom(s).

Examples of radicals R are alkyl radicals such as the methyl, ethyl, n-propyl, iso-propyl, n-butyl, iso-butyl, tert-butyl, n-pentyl, iso-pentyl, neo-pentyl, tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, octadecyl radicals such as the n-octadecyl radical; alkenyl radicals such as the vinyl and allyl radicals, cycloalkyl radicals such as cyclopentyl, cyclohexyl, cycloheptyl radicals and methylcyclohexyl radicals, aryl radicals such as the phenyl, naphthyl, anthryl and phenanthryl radicals; alkaryl radicals such as o-, m-, p-tolyl radicals, xylyl radicals and ethylphenyl radicals; aralkyl radicals such as the benzyl radical, the α- and the β-phenylethyl radical, with preference being given to the methyl radical, ethyl radical, n-propyl radical, isopropyl radical and n-butyl radical and particular preference being given to the methyl radical.

The radicals $R^1$ are preferably alkyl radicals having from 1 to 4 carbon atom(s). Examples of alkyl radicals $R^1$ are the methyl, ethyl, n-propyl, iso-propyl, n-butyl, iso-butyl and tert-butyl radicals, with preference being given to the methyl and ethyl radicals.

Examples of alkoxyalkyl radicals are the methoxyethyl radical and the ethoxyethyl radical.

The radicals Y preferably have the formula $$R^2{}_2NR^3(-NR^2-R^3)_x-\quad\quad\quad\quad\quad\quad\text{(II)}$$

where x is 0 or an integer from 1 to 10, $R^2$ can be identical or different and are each hydrogen, an alkyl radical, a cycloalkyl radical or a radical of the formula —C(=O)—R or —CH$_2$—CH$_2$—C(=O)—O—R (where R is as defined above) and $R^3$ is a divalent hydrocarbon radical having from 1 to 12 carbon atoms per radical.

Examples of alkyl or cycloalkyl radicals $R^2$ are the same as those given for alkyl and cycloalkyl radicals R.

Preferably, at least one hydrogen atom is bound to each nitrogen atom in the radicals of the formula (II).

Examples of radicals $R^3$ are the methylene, ethylene, propylene, butylene, cyclohexylene, octadecylene, phenylene and butylene radicals, with preference being given to the n-propylene radical, particularly because of the ready availability.

Examples of radicals Y are:

H$_2$N(CH$_2$)$_3$—

H$_2$N(CH$_2$)$_2$NH(CH$_2$)$_3$—

H$_2$N(CH$_2$)$_2$—

H$_3$CNH(CH$_2$)$_3$—

H$_2$N(CH$_2$)$_4$—

H$_2$N(CH$_2$)$_5$—

H(NHCH$_2$CH$_2$)$_3$—

C$_4$H$_9$NH(CH$_2$)$_2$NH(CH$_2$)$_2$— and cyclo—C$_6$H$_{11}$NH(CH$_2$)$_3$—, with particular preference being given to H$_2$N(CH$_2$)$_2$NH(CH$_2$)$_3$—.

The average value of a is preferably from 1.66 to 1.99, particularly preferably from 1.40 to 1.96. The average value of b is preferably from 0.01 to 0.25, particularly preferably from 0.02 to 0.17. The average value of c is preferably from 0 to 0.63, particularly preferably from 0 to 0.45.

The organopolysiloxanes comprising units of the formula (I) preferably have a viscosity at 25° C. of from 5 to 10,000 mm$^2$/s, particularly preferably from 10 to 5000 mm$^2$/s.

The organopolysiloxanes comprising units of the formula (I) preferably contain from 0.1 to 8% by weight, more preferably from 0.2 to 2.8% by weight, particularly preferably from 0.4 to 2.1% by weight, of basic nitrogen, in each case based on the total weight of the organopolysiloxane. The term "basic nitrogen" here refers to nitrogen calculated as element.

As organopolysiloxanes which contain at least one SiC-bonded organic radical containing basic nitrogen, preference is given to those of the formula $$Y_gR_{3-g}SiO(SiR_2O)_m(SiRYO)_nSiR_{3-g}Y_g\quad\quad\text{(III)}$$

where R and Y are as defined above, g is 0, 1 or 2, m is 0 or an integer from 1 to 500, n is 0 or an integer from 1 to 100, with the proviso that at least one radical Y is present per molecule and the m-units (SiR$_2$O) and the n-units (SiRYO) can be distributed in the molecule in any way.

The organopolysiloxanes comprising units of the formula (I) are particularly preferably essentially linear organopolysiloxanes having a ratio of diorganosiloxane units (SiR$_2$O) containing SiC-bonded radicals which contain no basic nitrogen to diorganosiloxy units (SiRYO) containing SiC-bonded radicals containing basic nitrogen of preferably from 300:1 to 5:1, particularly preferably from 100:1 to 10:1, in particular from 90:1 to 15:1.

Examples of organopolysiloxanes comprising units of the formula (I) are:

H$_2$N(CH$_2$)$_3$SiMe$_2$O(SiMe$_2$O)$_{15}$SiMe$_2$(CH$_2$)$_3$NH$_2$ (CH$_3$)$_3$SiO(SiMe[(CH$_2$)$_3$NH$_2$]O)(SiMe$_2$O)$_{25}$Si(CH$_3$)$_3$ (CH$_3$)$_3$SiO(SiMe[(CH$_2$)$_3$NH$_2$]O)(SiMe$_2$O)$_{90}$Si(CH$_3$)$_3$ (CH$_3$)$_3$SiO(SiMe[(CH$_2$)$_3$NHCH$_2$CH$_2$NH$_2$]O)(SiMe$_2$O)$_{45}$Si(CH$_3$)$_3$ (CH$_3$)$_3$SiO(SiMe[(CH$_2$)$_3$NHCH$_2$CH$_2$NH$_2$]O)(SiMe$_2$O)$_{90}$Si(CH$_3$)$_3$

MeO(CH$_3$)$_2$SiO(SiMe[(CH$_2$)$_3$NHCH$_2$CH$_2$NH$_2$]O)(SiMe$_2$O)$_{70}$Si(CH$_3$)$_2$OMe

H$_2$N—CH$_2$CH$_2$—NH—(CH$_2$)$_3$SiMe$_2$O(SiMe$_2$O)$_{50}$SiMe$_2$(CH$_2$)$_3$NH—CH$_2$CH$_2$—$_{NH2}$.

Methods of preparing organopolysiloxanes comprising units of the formula (I) are generally known. Mention may be made, by way of example, of W. Noll, "Chemistry and Technology of Silicones", Academic Press Inc., 1968, pages 208–209 and U.S. Pat. No 4,661,551.

The water-soluble organic or inorganic acids which can be used for preparing constituent A of the organopolysiloxane compositions of the invention can be the same as those which have also been able to be used previously for preparing salts of water-soluble organic or inorganic acids and organopolysiloxanes containing SiC-bonded radicals which contain basic nitrogen.

Examples of such water-soluble acids are formic acid, acetic acid, propionic acid, butyric acid, diethyl hydrogen phosphate, HCl, H$_2$SO$_4$ and H$_3$PO$_4$, with preference being given to acetic acid and H$_2$SO$_4$ and particular preference being given to acetic acid.

The water-insoluble organic acids which can be used for preparing constituent A of the organopolysiloxane compositions of the invention can likewise be the same ones which have also been able to be used previously for preparing salts of water-insoluble organic acids and organopolysiloxanes containing SiC-bonded radicals which contain basic nitrogen. Examples of such water-insoluble acids are oleic acid, palmitic acid and stearic acid, with particular preference being given to oleic acid.

The constituent (B) of the organopolysiloxane compositions of the invention comprises commercially available and well studied surfactants such as sorbitan esters of fatty acids having from 10 to 22 carbon atoms; polyoxyethylene-sorbitan esters of fatty acids having from 10 to 22 carbon atoms and containing up to 35% of ethylene oxide; polyoxyethylene-sorbitol esters of fatty acids having from 10 to 22 carbon atoms; polyoxyethylene derivatives of phenols having from 6 to 20 carbon atoms in the aromatic and containing up to 95percent of ethylene oxide; fatty aminobetaines and amidobetaines having from 10 to 22 carbon atoms; polyoxyethylene condensates of fatty acids or fatty alcohols having from 10 to 22 carbon atoms and containing up to 95 percent of ethylene oxide; ionic surfactants such as alkylaryl sulfonates having from 6 to 20 carbon atoms in the alkyl group; fatty acid soaps having from 10 to 22 carbon atoms; fatty sulfates having from 10 to 22 carbon atoms; alkylsulfonates having from 10 to 22 carbon atoms; alkali metal salts of dialkyl sulfosuccinates; fatty amine oxides having from 10 to 22 carbon atoms; fatty imidazolines having from 6 to 20 carbon atoms; fatty amidosulfobetaines having from 10 to 22 carbon atoms; quaternary surfactants such as fatty ammonium compounds having from 10 to 22 carbon atoms; fatty morpholine oxides having from 10 to 20 carbon atoms; alkali metal salts of carboxylated, ethoxylated alcohols having from 10 to 22 carbon atoms and containing up to 95 percent of ethylene oxide; ethylene oxide condensates of fatty acid monoesters of glycerol having from 10 to 22 carbon atoms and containing up to 95 percent of ethylene oxide; monoethanolamides or diethanolamides of fatty acids having from 10 to 22 carbon atoms; alkoxylated silicone surfactants containing ethylene oxide and/or propylene oxide units; and phosphate esters.

As is well known in the field of surfactants, the counterions in the case of anionic surfactants can be alkali metals, ammonia or substituted amines such as trimethylamine of triethanolamine. Preference is normally given to ammonium, sodium and potassium ions. In the case of cationic surfactants, the counterion is a halide, sulfate or methyl sulfate. Chlorides are the most readily available compounds in industry.

The above-mentioned fatty structures usually represent the lipophilic half of the surfactants. A customary fatty group is an alkyl group of natural or synthetic origin. Known unsaturated groups are the oleyl, linoleyl, decenyl, hexadecenyl and dodecenyl radicals. Alkyl groups can here be cyclic, linear or branched. Other possible surfactants are sorbitol monolaurate-ethylene oxide condensates; sorbitol monomyristate-ethylene oxide condensates; sorbitol monostearate-ethylene oxide condensates; dodecylphenol-ethylene oxide condensates; myristylphenol-ethylene oxide condensates; octylphenol-ethylene oxide condensates; stearylphenol-ethylene oxide condensates; lauryl alcohol-ethylene oxide condensates; stearyl alcohol-ethylene oxide condensates; decylaminobetaine; cocoamidosulfobetaine; olylamidobetaine; cocoimidazoline; cocosulfoimidazoline; cetylimidazoline; 1-hydroxyethyl-2-heptadecenylimidazoline; n-cocomorpholine oxide; decyldimethylamine oxide; cocoamidodimethylamine oxide; sorbitan tristearate with condensed ethylene oxide groups; sorbitan trioleate with condensed ethylene oxide groups; sodium or potassium dodecyl sulfate; sodium or potassium stearyl sulfate; sodium or potassium dodecylbenzenesulfonate; sodium or potassium stearylsulfonate; the triethanolamine salt of dodecyl sulfate; trimethyldodecylammonium chloride; trimethylstearylammonium methosulfate; sodium laurate; sodium or potassium myristate.

The constituent (B) can consist of one of the abovementioned surfactants or a mixture of two or more of the abovementioned surfactants.

The constituent (C) of the organopolysiloxane compositions of the invention usually comprises commercially available substituted or unsubstituted di(meth)acrylates and/or oligo(meth)acrylates which may be soluble or insoluble in water.

The constituent (C') which may be concomitantly used in the organopolysiloxane compositions of the invention usually comprises commercially available substituted or unsubstituted (meth)acrylates which may be soluble or insoluble in water.

Examples of unsubstituted di(meth)acrylates are: hexanediol diacrylate, butanediol diacrylate, GX-8370 (Siber-Hegner), 1,3-butanedioldimethacrylate, and neopentyl glycol diacrylate.

Examples of substituted di(meth)acrylates are: 1-acryloxy 2-hydroxy 3-methacryloxpropane, 2,2-dimethylpropyl 2,2-dimethylpropionate diacrylate, pentaerythritol diacrylate monostearate, polyethylene glycol-400 diacrylate, polyethylene glycol-300 diacrylate, polypropylene glycol-400 diacrylate, tetraethylene glycol diacrylate, polypropylene glycol-700 diacrylate, 2,2-bis[-4-(acryloxydiethoxy)phenyl] propane, triethylene glycol diacrylate, tripropylene glycol diacrylate, SR 349 (Sartomer), polyethylene glycol-600 diacrylate, and propoxylated neopentyl glycol diacrylate.

An example of an unsubstituted oligo(meth)acrylate is trimethylolpropane triacrylate.

Examples of substituted oligo(meth)acrylates are: M-325 (Siber-Hegner), dipentacrythritol pentaacrylate and hexaacrylate, A-TMMT (Siber-Hegner), tetramethylolmethane triacrylate, trimethylolmethanol triacrylate, trimethylolpropane ethoxylate triacrylate, tris(acryloyloxyethyl) phosphate, tris(2-hydroxyethyl)isocyanurate triacrylate, ethoxylated trimethylolpropane triacrylate, propoxylated trimethylolpropane triacrylate, propoxylated glyceryl triacrylate, di(trimethylolpropane) tetraacrylate, di(pentaerythritol) pentaacrylate, and ethoxylated pentaerythritol tetraacrylate.

Examples of unsubstituted mono(meth)acrylates are methyl acrylate, ethyl acrylate, butyl acrylate, methyl methacrylate, cyclohexyl acrylate, isobornyl acrylate, lauryl acrylate, stearyl acrylate, ethylhexyl acrylate, tridecyl acrylate, isooctyl acrylate.

Examples of substituted mono(meth)acrylates or related compounds are: perfluoroalkylethyl acrylate (Fluowet AC 812, Hoechst AG), 2-acrylamido-2-methyl-1-propanesulfonic acid (Lubrizol), 2-acryloyloxyethyl hydrogen phthalate (Viscoat 2000, Siber-Hegner GmbH), beta-acryloyloxyethyl hydrogen succinate (ASA, Siber-hegner GmbH), acryloyloxyethylphosphoric acid (Lightester PA, Toagosei), 2-acryloyloxypropyl hydrogen phthalate (Viscoat 2100, Siber-Hegner GmbH), the potassium salt of (3-sulfopropyl) acrylate, the dipotassium salt of bis(3-sulfopropyl) itaconate, N,N-dimethyl-N-methacryloxaethyl-N-(3-sulfopropyl)ammonium betaine, 2-carboxyethyl acrylate, 2-hydroxyethyl acrylate, 2-ethylthioethyl methacrylate, acrylamide, methyl 2-acrylamido-2-methoxyacetate, acrylonitrile, (2-(acryl-oxy)ethyl)(4-benzenebenzyl)dimethylammonium bromide, (2-hydroxyethyl) acrylate, acryloxydimethylbutyrolactone, acrylic acid, methoxypolyethylene glycol- 400 acrylate, nonylphenol ethoxylate acrylate (N-117E, Siber-Hegner), nonylphenol diethoxylate acrylate, phenoxydiethylene glycol acrylate, phenoxyethyl acrylate, dimethylaminoethyl acrylate, methyl chloride salt of dimethylaminoethyl acrylate, glycidyl acrylate, phenoxypolyethylene glycol acrylate, 2,2,3,3-tetrafluoropropyl acrylate, methoxypolyethylene glycol-1000 methacrylate, tetrahydrofurfuryl acrylate, caprolactone acrylate, 2(2-ethoxyethoxy)ethyl acrylate, 2-acrylamidoglycolic acid.

The constituent (C) can consist of a mixture of two or more diacrylates and/or oligoacrylates. The constituent (C) is used in an amount sufficient for the crosslinking of the organopolysiloxanes (A) in emulsion during the course of a reaction similar to a Michael addition.

In the process of the invention, preference is given to using 0.001–10 mol, more preferably 0.01–5 mol and particularly preferably 0.1–3 mol, of acrylate double bond in (C) per mole of the SiC-bonded organic radical containing basic nitrogen in (A), preferably per mole of radical Y in (A), more preferably per mole of the radical of the formula (II).

In the process of the invention, it is possible to use compounds known from the literature which catalyze reactions similar to the Michaeal addition. Examples are acetic acid, tin(IV) chloride, sodium methoxide, alkali metal amides, ammonium salts, phosphonium salts, sulfonium salts, tetramethylguanidine, 1,5-diazabicyclo[4.3.0]non-5-ene and 1,8-diazabicyclo[5.4.0]undec-7-ene.

If a catalyst is used in the process of the invention, it is used in amounts of preferably from 0.001 to 1% by weight, more preferably from 0.01 to 0.1% by weight, in each case based on the total weight of constituents (A) and (C).

In the process of the invention, excess acrylate double bonds can be reacted further by means of a free-radical polymerization or via a hydrosilylation reaction.

Constituent (B) is present in the organopolysiloxane compositions of the invention in amounts of preferably from 0.1 to 200% by weight, particularly preferably from 15 to 150% by weight, in each case based on the total weight of constituent (A).

Constituent (C) is present in the organopolysiloxane compositions of the invention in amounts of preferably from 0.1 to 250% by weight, particularly preferably from 1 to 150% by weight, in each case based on the total weight of constituent (A).

Constituent (D) is present in the organopolysiloxane compositions of the invention in amounts of preferably from 95 to 20% by weight, particularly preferably from 80 to 40% by weight, in each case based on the total weight of constituent (A).

The organopolysiloxane compositions of the invention are preferably prepared by emulsifying the constituents (A) and (B) in (D) to form an oil-in-water (micro)emulsion and subsequently reacting this with (C) and, if desired, (C'). However, they can also be prepared by mixing and emulsifying the constituents (A), (B), (C), if desired (C') and (D).

This mixing or emulsification is carried out at a temperature of preferably from 10° C. to 100° C., particularly preferably from 25° C. to 90° C., and a pressure of preferably from 900 to 2000 hPa. However, it can also be carried out at higher or lower pressures.

The organopolysiloxane compositions of the invention are clear microemulsions to milky white emulsions. All organopolysiloxane (micro)emulsions are stable. If component (D) is removed, clear to slightly opaque, insoluble silicone materials are obtained.

The organopolysiloxane compositions of the invention can be employed for the treatment of textiles, e.g. woven fabrics, knitteds or nonwovens. The invention further provides for textile fiber finishing and leather treatment. In addition, the compositions of the invention are used in the cosmetic, cleaning, adhesive, polish, surface coating, paper, and building sectors. They are also used as antifoams and as compatibilizers for organosilicon compounds and organic rubbers.

The compositions of the invention can be applied to the substrate to be treated by, for example, spraying, painting or dipping.

Furthermore, the organopolysiloxane compositions of the invention can be used for all applications in which organosilicon compounds in aqueous emulsion form have also been used hitherto.

The organopolysiloxane compositions of the invention have the advantage that aminosilicone oil (micro)emulsions are reacted with diacrylates or oligoacrylates and, if desired, acrylates in a reaction similar to a Michael addition without the emulsion breaking or creaming and without the organopolysiloxane being crosslinked. In a simple process, commercially available (micro)emulsions can be crosslinked in a targeted manner and additionally functionalized by means of readily available acrylate starting materials.

The organopolysiloxane compositions of the invention are notable for their simple method of preparation and the possibility of targeted crosslinking. They contain no transition metal as crosslinking catalyst.

The organopolysiloxane compositions of the invention can be made ionic and/or hydrophilic in a targeted way by addition of functionalized diacrylates or oligoacrylates and, if desired, acrylates.

The organopolysiloxane compositions of the invention display good permanence, a low tendency to yellowing, and a good feel on substrates which have been treated therewith.

The silicone latices of the invention can be made brittle to elastic depending on the crosslinking density.

The organopolysiloxane compositions of the invention comprising alkoxylated diacrylates or oligoacrylates and, if desired, alkoxylated acrylates display good shear stability and heat resistance.

The organopolysiloxane compositions of the invention containing ionic groups have good pH stability and salt stability.

EXAMPLE 1

160.3 g (8 mmol of free amino groups) of an emulsion of a silicone oil containing aminoethylaminopropyl groups and having a solids content of 23.5% (Finish CT 95 E, commercially available from Wacker-Chemie GmbH) are admixed with 0.904 g (4 mmol) of 1,6-hexanediol diacrylate and stirred for twelve hours at room temperature at 500 rpm.

After filtration through a fine metal mesh, a stable opaque emulsion having a solids content of 22.5% is obtained. If the emulsion is dried to constant weight, an elastic, insoluble film is obtained.

EXAMPLE 2

The procedure of Example 1 is repeated, except that the emulsion is stirred for 4 hours at 60° C. in place of the 12 hour reaction time at room temperature. A stable, opaque, crosslinked emulsion having a solids content of 22.3% is again obtained.

EXAMPLE 3

The procedure of Example 1 is repeated using 0.796 g (2.76 mmol) of pentaerythritol triacrylate in place of the 0.904 g of 1,6-hexanediol diacrylate. A stable, milky white emulsion having a solids content of 23.9% is obtained.

EXAMPLE 4

The procedure of Example 1 is repeated using 0.933 g (2 mmol) of di(trimethylolpropane) tetraacrylate in place of the 0.904 g of 1,6-hexanediol diacrylate. An opaque, stable emulsion having a solids content of 24% is obtained. If the emulsion is dried to constant weight, a crosslinked silicone rubber is obtained.

EXAMPLE 5

The procedure of Example 1 is repeated using 0.452 g (2 mmol) instead of 0.904 g of 1,6-hexanediol diacrylate. An opaque, crosslinked emulsion containing 4 mmol of free amino groups and having a solids content of 24.1% is obtained.

EXAMPLE 6

The procedure of Example 1 is repeated using 1.59 g (5.33 mmol) of pentaerythritol triacrylate in place of the 0.904 g of 1,6-hexanediol diacrylate. A milky emulsion containing 8 mmol of available acrylate groups which can be utilized for subsequent free-radical crosslinking is obtained. The solids content is 23.3%.

EXAMPLE 7

149.6 g (6 mmol of free amino groups) of an emulsion of a silicone oil containing aminoethylaminopropyl groups and having a solids content of 51.1% (Finish CT 33 E, commercially available from Wacker-Chemie GmbH) are admixed with 0.68 g (3 mmol) of 1,6-hexanediol diacrylate and stirred for twelve hours at room temperature at 800 rpm.

After filtration through a fine metal mesh, a stable clear microemulsion having a solids content of 44.9% is obtained. If the emulsion is dried to constant weight, a transparent, elastic film which is insoluble in organic solvents is obtained.

EXAMPLE 8

153.9 g (4 mmol of free amino groups) of an emulsion of a silicone oil containing aminoethylaminopropyl groups and having a solids content of 39.2% (Finish CT 45 E, commercially available from Wacker-Chemie GmbH) are admixed with 0.425 g (2 mmol) of neopentyl glycol diacrylate and stirred for twelve hours at room temperature.

After filtration through a fine metal mesh, a stable, milky emulsion having a solids content of 39.3% is obtained.

EXAMPLE 9

1975 g (109.7 mol) of water together with 24 g of Dodigen 226 and 0.8 g (20 mmol) of sodium hydroxide are placed in a reaction vessel at 90° C. A mixture of 373 g (1.26 mol) of octamethyltetrasiloxane, 23.6 g (0.106 mol) of aminoethylaminopropyltrimethoxysilane, 27.7 g (0.2 mol) of methyltrimethoxysilane and 80 g (2.5 mol) of methanol is added dropwise at 90° C. over a period of 4 hours. After a reaction time of 2 hours, 600 ml of distillate are removed at 90° C. 5.66 g (8 mmol) of a diacrylate of the formula $CH_2=CH-C(=O)-(O-CH_2-CH_2)_{15}-O-C(=O)-CH=CH_2$, commercially available under the trade name SR 610 from Sartomer, are added dropwise to the opalescent suspension and the mixture is stirred at room temperature for another 12 hours. After filtration, a stable, milky yellow suspension having a solids content of 21.5 percent is obtained.

EXAMPLE 10

156.9 g (4 mmol of free amino groups) of an emulsion of a silicone oil containing aminoethylaminopropyl groups and having a solids content of 25.3% (Finish CT 96 E, commercially available from Wacker-Chemie GmbH) are admixed with 0.398 g (1.34 mmol) of pentaerythritol triacrylate and stirred for 12 hours at room temperature. After filtration, a stable, translucent emulsion having a solids content of 24.2 percent is obtained.

EXAMPLE 11

The procedure of Example 1 is repeated using 2.63 g (6 mmol) of an acrylate of the formula $CH_2=CH-C(=O)-(O-CH_2-CH_2)_9-OCH_3$, commercially available under the trade name AM-90G from Siber & Hegner, are used in place of the 0.904 g of 1,6-hexanediol diacrylate. A translucent, crosslinked emulsion containing 2 mmol of free residual amino groups and having a solids content of 23.9% is obtained. The emulsion is then crosslinked further with 0.23 g (1 mmol) of 1,6-hexanediol diacrylate.

EXAMPLE 12

The procedure of Example 1 is repeated using 0.09 g (0.4 mmol) of 1,6-hexanediol diacrylate and 1.49 g (7.2 mmol) of 2-acrylamido-2-methyl-1-propanesulfonic acid from Lubrizol in place of the 0.904 g of 1,6-hexanediol diacrylate.

After filtration, a stable, crosslinked and opaque emulsion having a solids content of 23.1% is obtained.

EXAMPLE 13

The procedure of Example 1 is repeated using 0.27 g (1.2 mmol) of 1,6-hexanediol diacrylate and 1.7 g (5.6 mmol) of acryloxyethyltrimethylammonium chloride as an 80% strength by weight aqueous solution from Atochem in place of the 0.904 g of 1,6-hexanediol diacrylate.

After filtration, a stable, crosslinked emulsion having a viscosity of 5700 mm²/s at 25° C. and a solids content of 23% is obtained.

EXAMPLE 14

The procedure of Example 1 is repeated using 1.13 g (1.6 mmol) of a diacrylate of the formula $CH_2=CH-C(=O)-(O-CH_2-CH_2)_{15}-O-C(=O)-CH=CH_2$, commercially available under the trade name SR 610 from Sartomer, and 1.267 g (4.8 mmol) of 2-acryloyloxyethyl hydrogen phthalate from Siber & Hegner in place of the 0.904 g of 1,6-hexanediol diacrylate.

After filtration, a stable, crosslinked emulsion having a solids content of 24.8% is obtained.

EXAMPLE 15

The procedure of Example 1 is repeated using 0.24 g (0.8 mmol) of tripropylene glycol diacrylate and 0.31 g (1.6 mmol) of acryloyloxyethyl phosphoric acid from Siber & Hegner in place of the 0.904 g of 1,6-hexanediol diacrylate.

After filtration, a stable, crosslinked emulsion having a solids content of 39.5% is obtained.

EXAMPLE 16

The procedure of Example 1 is repeated using 0.098 g (0.4 mmol) of dipropylene glycol diacrylate and 0.587 g (3.6 mmol) of acrylamidoglycolic acid hydrate in place of the 0.904 g of 1,6-hexanediol diacrylate.

After filtration, a stable, opaque and crosslinked emulsion having a solids content of 23.2% is obtained.

EXAMPLE 17

The procedure of Example 1 is repeated using 1.02 g (2 mmol) of pentaerythritol diacrylate monostearate and 0.464 g (4 mmol) of hydroxyethyl acrylate in place of the 0.904 g of 1,6-hexanediol diacrylate. After filtration, a stable, crosslinked emulsion having a solids content of 25.4% is obtained.

EXAMPLE 18

The procedure of Example 8 is repeated using 0.09 g (0.4 mmol) of 1,6-hexanediol diacrylate and 0.115 g (1.6 mmol) of acrylic acid in place of the 0.425 g of neopentyl glycol diacrylate.

After filtration through a fine metal mesh, a stable, crosslinked and milky emulsion having a solids content of 40.2% is obtained.

EXAMPLE 19

3.2 g (0.178 mol) of water, 0.226 g (1 mmol) of 1,6-hexanediol diacrylate and 6.57 g (15 mmol) of an acrylate of the formula $CH_2=CH-C(=O)-(O-CH_2-CH_2)_9-OCH_3$, commercially available under the trade name AM-90G from Siber & Hegner, are placed in a reaction vessel and stirred. While stirring at 10,000 rpm by means of a Turrax stirrer, 10 g (6 mmol of free amino groups) of a silicone oil containing aminoethylaminopropyl groups and having a viscosity of 900 mm²/s at 25° C. (Finish WT 1650, commercially available from Wacker-Chemie GmbH) are quickly added thereto. This forms a water-in-oil emulsion which is finally admixed with 52 g (2.9 mol) of water. A stable, crosslinked, milky emulsion having a solids content of 30% is obtained.

What is claimed is:

1. An organopolysiloxane composition comprising:
   (A) organopolysiloxanes which contain at least one SiC-bonded organic radical containing basic nitrogen, where the basic nitrogen is optionally present in part as a salt of a water-soluble organic acid, water-soluble inorganic acid, or water-insoluble organic acid;
   (B) anionic, cationic, nonionic or amphoteric surfactants;
   (C) substituted or unsubstituted di(meth)acrylates and/or oligo(meth)acrylates and optionally, (C') substituted or unsubstituted (meth)acrylates, acrylonitrile, acrylamide, or acrylic acid; and
   (D) water.

2. An organopolysiloxane composition which can be prepared by reacting an emulsion comprising:
   (A) organopolysiloxanes which contain at least one SiC-bonded organic radical containing basic nitrogen, where the basic nitrogen is optionally present in part as a salt of a water-soluble organic acid, water-soluble inorganic acid, or water-insoluble organic acid;
   (B) anionic, cationic, nonionic or amphoteric surfactants;
   (D) water with
   (C) substituted or unsubstituted di(meth)acrylates and/or oligo(meth)acrylates, and optionally, (C') substituted or unsubstituted (meth)acrylates, acrylonitrile, acrylamide, or acrylic acid in a reaction similar to a Michael addition.

3. A process for preparing organopolysiloxane compositions which comprises reacting emulsions comprising:
   (A) organopolysiloxanes which contain at least one SiC-bonded organic radical containing basic nitrogen, where the basic nitrogen is optionally present in part as a salt of a water-soluble organic acid, water-soluble inorganic acid, or water-insoluble organic acid;
   (B) anionic, cationic, nonionic or amphoteric surfactants;
   (D) water with
   (C) substituted or unsubstituted di(meth)acrylates and/or oligo(meth)acrylates, and optionally, (C') substituted or unsubstituted (meth)acrylates, acrylonitrile, acrylamide, or acrylic acid in a reaction similar to a Michael addition.

4. The process as claimed in claim 3, wherein the constituent (A) used comprises organopolysiloxanes comprising units of the formula $$R_a Y_b Si(OR^1)_c O_{\frac{4-(a+b+c)}{2}}, \quad (I)$$

where
   R can be identical or different and are each a hydrogen atom or a monovalent organic radical containing no basic nitrogen,
   $R^1$ can be identical or different and are each a hydrogen atom, an alkyl radical or an alkoxyalkyl radical,
   Y can be identical or different and are each a monovalent, SiC-bonded radical containing basic nitrogen,
   a is 0, 1, 2 or 3
   b is 0, 1 or 2 and
   c is 0, 2 or 3,
with the proviso that the sum of a, b and c in the units of the formula (I) is less than or equal to 3 and at least one radical Y is present per molecule.

5. The composition of claim 1, wherein at least one of said organopolysiloxanes (A) has the formula $$Y_g R_{3-g} SiO(SiR_2O)_m (SiRYO)_n SiR_{3-g} Y_g$$

where
   each R independently is hydrogen or an alkyl, cycloalkyl, or aryl organic radical containing no basic nitrogen;
   each Y independently is a monovalent SiC-bonded hydrocarbon radical containing basic nitrogen,
   g is 0, 1, or 2
   m is an integer from 1 to 500
   n is 0 or an integer from 1 to 100, with the proviso that at least one radical Y is present per molecule.

6. The composition of claim 5, wherein m is an integer from 15 to 500.

7. The composition of claim 5, wherein R is a $C_{1-18}$ radical.

8. The composition of claim 1, wherein (C) comprises a non-polymeric di- or oligo(meth)acrylate.

9. The composition of claim 8, wherein said di- or oligo(meth)acrylate comprises one or more di- or oligo(meth)acrylates selected from the group consisting of hexanediol diacrylate, butanediol diacrylate, 1,3-butanediol dimethacrylate, neopentyl glycol diacrylate, pentaerythritol diacrylate monostearate, 2,2-bis[4-acryloxydiethoxyphenyl] propane, trimethylolpropane triacrylate, dipentaerythritol pentaacrylate, dipentaerythritol hexaacrylate, tetramethylolmethane triacrylate, trimethylolmethanol triacrylate, tris(acryloyloxyethyl) phosphate, tris(2-hydroxyethyl) isocyanate triacrylate, and di(trimethylolpropane) tetraacrylate.

10. The composition of claim 2, wherein at least one of said organopolysiloxanes (A) has the formula

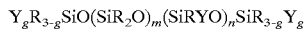

where
- each R independently is hydrogen or an alkyl, cycloalkyl, or aryl organic radical containing no basic nitrogen;
- each Y independently is a monovalent SiC-bonded hydrocarbon radical containing basic nitrogen,
- g is 0, 1, or 2
- m is an integer from 1 to 500
- n is 0 or an integer from 1 to 100, with the proviso that at least one radical Y is present per molecule.

11. The composition of claim 10, wherein m is an integer from 15 to 500.

12. The composition of claim 10, wherein R is a $C_{1-18}$ radical.

13. The composition of claim 2, wherein (C) comprises a non-polymeric di- or oligo(meth)acrylate.

14. The composition of claim 13, wherein said di- or oligo(meth)acrylate comprises one or more di- or oligo(meth)acrylates selected from the group consisting of hexanediol diacrylate, butanediol diacrylate, 1,3-butanediol dimethacrylate, neopentyl glycol diacrylate, pentaerythritol diacrylate monostearate, 2,2-bis[4-acryloxydiethoxyphenyl] propane, trimethylolpropane triacrylate, dipentaerythritol pentaacrylate, dipentaerythritol hexaacrylate, tetramethylolmethane triacrylate, trimethylolmethanol triacrylate, tris(acryloyloxyethyl) phosphate, tris(2-hydroxyethyl) isocyanate triacrylate, and di(trimethylolpropane) tetraacrylate.

15. The composition of claim 3, wherein at least one of said organopolysiloxanes (A) has the formula

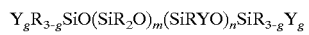

where
- each R independently is hydrogen or an alkyl, cycloalkyl, or aryl organic radical containing no basic nitrogen;
- each Y independently is a monovalent SiC-bonded hydrocarbon radical containing basic nitrogen,
- g is 0, 1, or 2
- m is an integer from 1 to 500
- n is 0 or an integer from 1 to 100, with the proviso that at least one radical Y is present per molecule.

16. The composition of claim 15, wherein m is an integer from 15 to 500.

17. The composition of claim 15, wherein R is a $C_{1-18}$ radical.

18. The composition of claim 3, wherein (C) comprises a non-polymeric di- or oligo(meth)acrylate.

19. The composition of claim 18, wherein said di- or oligo(meth)acrylate comprises one or more di- or oligo(meth)acrylates selected from the group consisting of hexanediol diacrylate, butanediol diacrylate, 1,3-butanediol dimethacrylate, neopentyl glycol diacrylate, pentaerythritol diacrylate monostearate, 2,2-bis[4-acryloxydiethoxyphenyl] propane, trimethylolpropane triacrylate, dipentaerythritol pentaacrylate, dipentaerythritol hexaacrylate, tetramethylolmethane triacrylate, trimethylolmethanol triacrylate, tris(acryloyloxyethyl) phosphate, tris(2-hydroxyethyl) isocyanate triacrylate, and di(trimethylolpropane) tetraacrylate.

* * * * *